United States Patent [19]

Thompson

[11] 4,136,133

[45] Jan. 23, 1979

[54] BLOCK COPOLYMER OF POLY (OXA-AMIDE) AND POLYAMIDE

[75] Inventor: Robert M. Thompson, Wilmington, Del.

[73] Assignee: Sun Ventures, Inc., Radnor, Pa.

[21] Appl. No.: 774,364

[22] Filed: Mar. 4, 1977

Related U.S. Application Data

[63] Continuation-in-part of Ser. No. 562,621, Mar. 27, 1975, abandoned, which is a continuation-in-part of Ser. No. 415,583, Nov. 14, 1973, abandoned.

[51] Int. Cl.$^2$ .............................................. C08L 77/06
[52] U.S. Cl. ............................................. 260/857 TW
[58] Field of Search ...................... 260/78 R, 857 TW

[56] References Cited

U.S. PATENT DOCUMENTS

| | | | |
|---|---|---|---|
| 2,339,237 | 1/1944 | Brubaker | 260/78 |
| 3,397,107 | 8/1968 | Kimura | 260/857 TW |
| 3,509,106 | 4/1970 | Lotz | 260/78 |
| 3,683,047 | 8/1972 | Honda | 260/857 TW |

FOREIGN PATENT DOCUMENTS

| | | |
|---|---|---|
| 822166 | 5/1975 | Belgium. |
| 562370 | 6/1944 | United Kingdom. |
| 574713 | 1/1946 | United Kingdom. |
| 615954 | 1/1949 | United Kingdom. |
| 1030344 | 5/1966 | United Kingdom. |
| 1304865 | 1/1973 | United Kingdom. |

*Primary Examiner*—Paul R. Michl
*Attorney, Agent, or Firm*—J. Edward Hess; Donald R. Johnson; Anthony Potts, Jr.

[57] ABSTRACT

Novel block copolymer formed by melting blending a melt spinnable polyamide such as nylon-6 and a poly-(oxa-amide) such as poly(4-oxaheptamethylene adipamide) (also known as N-303-6) is disclosed. Said copolymer has utility as a fiber. The fiber of copolymer, for example of nylon-6 and said poly-(oxa-amide) has superior absorption characteristics than that of nylon-6. Furthermore, resulting fiber (N-303-6//6) still substantially maintains the other desirable properties of the major constituent, for example nylon-6.

47 Claims, No Drawings

BLOCK COPOLYMER OF POLY (OXA-AMIDE) AND POLYAMIDE

CROSS REFERENCE TO RELATED APPLICATIONS

This application is a continuation-in-part of U.S. patent application Ser. No. 562,621, filed Mar. 27, 1975, now abandoned, which in turn is a continuation-in-part of U.S. application Ser. No. 415,583, filed Nov. 14, 1973, now abandoned, and the latter is related to Ser. No. 415,582, filed Nov. 14, 1973 by Robert M. Thompson and Richard S. Stearns; title of the application is "Copolymer of Blocks of Alternating Poly(dioxaamide) and Polyamide". This application is also related to Ser. Nos. 418,524 and 415,610, both filed Nov. 14, 1973, by present inventor and titled "Block Copolymer of Poly(dioxaamide) and Polyamide" and "Block Copolymer of Poly(dioxa-arylamide) and Polyamide", respectively. This application is also related to Ser. No. 415,581, filed Nov. 14, 1973, by Elmer J. Hollstein. Subject matter of this latter application relates to a method for the hydrogenation of a dinitrile, which is a precursor of a hydrophilic polymer disclosed within the aforementioned related applications.

BACKGROUND OF THE INVENTION

It is known that commercially important polyamides, such as nylon-6, has excellent physical properties in many respects. However, for certain textile applications fabrics and similar products prepared from such nylons are somewhat deficient in moisture absorption as compared to a natural fiber such as cotton. This characteristic is important because according to ENCYCLOPEDIA OF POLYMER SCIENCE, Vol. 10, Section Polyamide Fibers, moisture absorption determines comfort factors, ease and cost of dyeing, antistatic character and hand or feel of the fabric. To overcome this moisture absorption deficiency many attempts have been made, but none have been commercially successful to date.

Disclosed herein is a novel block copolymer which can be converted into a fiber having moisture absorption properties superior to that of commercially used polyamide such as nylon-6. This novel block copolymer consists of a specified polyamide and a specified poly(oxa-amide). Surprisingly the incorporation of a specified poly(oxa-amide) into a specified polyamide does not adversely effect the many desirable fiber properties of the polyamide and in fact improvement in certain mechanical properties such as initial modulus and strength can be obtained. Furthermore incorporation of said poly(oxa-amide) materially improves its moisture absorption property. Also the copolymer can be formed into a desired shape by extrusion, injection molding and other well known thermoplastic forming methods.

A block copolymer can result when a mixture of polymer Y and polymer Z, both of which contain amides, is properly processed. Thus the resulting block copolymer contains relatively long chains of a particular chemical composition, the chains being separated by a polymer of different chemical composition, thus diagrammatically

Y Z Y

Another type of block copolymer can also contain relatively long chains of a particular chemical composition but in this type the chains are separated by a low molecular weight "coupling group", thus diagrammatically

Each of the aforementioned polymer chains, i.e., Y and/or Z can be a homopolymer or a random copolymer.

Generally, copolymers containing the amide function, i.e., $$-\underset{\underset{H}{|}}{N}-\underset{\underset{O}{\|}}{C}-$$

can be formed by melting two polyamides. Thus when two different polyamides are mixed and heated above their melting point copolymers are formed. This process is also known as melt blending. However, the length of time the polymers are maintained at a temperature above their melting points has a profound effect on the resulting structure. As the mixing at the elevated temperature begins the mass is a physical mixture of two different compounds. But gradually as the heating and mixing continues the mixture is converted into a copolymer characterized as a "block" copolymer. However, if the heating and mixing continues the length of the "blocks" decreases and sequences of "random" appear. If the heating and mixing occurs for a sufficient time most of the "blocks" disappear and mostly random sequences form as evidenced by deterioration of its physical properties including melting point. At present there is no known direct way of determining chain sequence of such a polymer. But indirect methods exist, such as melting point for example, discussed in detail hereinafter. Controlled decomposition of such a copolymer will yield all identifiable components that make up the copolymer but will not indicate sequences.

Polymers, including copolymers, containing amide functional groups generally result from a reaction known as condensation. Condensation refers to a polymer forming reaction in which water is a by-product. The various types of polymers that can be produced from condensation (or step growth polymerization) are described hereinafter. The initial stage of a condensation polymerization consists of random combinations of two monomeric units to form dimer molecules. Examples of these could be the formation of two units of nylon-11 from the corresponding amino acid (11-aminoundecanoic acid) in the case of an AB polyamide

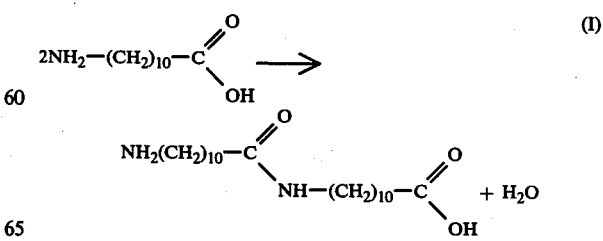

or adipic acid molecule and hexamethylene diamine in an AABB system

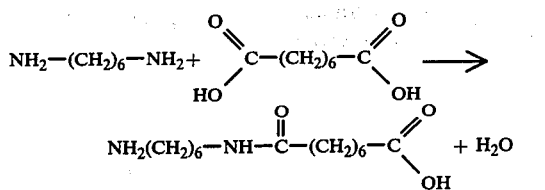

(II)

The letter "A" refers to one of the functional groups of the monomer, "B" refers to the other.

The foregoing dimer molecules will combine with equal facility with another monomeric unit or a dimer unit. In this fashion, the average degree of polymerization $\overline{(DB)}$ builds during the course of the reaction. This is discussed in greater detail in ORGANIC CHEMISTRY OF SYNTHETIC HIGH POLYMERS, Robert W. Lenz, Library of Congress Catalog Card No. 66-22057.

In the same manner as reactions I and II, random copolymers can be formed. The only condition necessary is that more than one type (or two if an AABB system is used) of monomer units be present during the condensation reaction. Thus following from the example about where monomers of AB and AABB polymers are present in the same reactor at the beginning of the polymerization, the AB monomer (amino acid) will react with a similar unit or the AABB monomer unit (the diamine or diacid) in a random fashion if their reactivities are similar. The final result of such a polymerization will be a random copolymer. If their reactivities are very dissimilar, there would be a tendency to become blocks, however, units have similar carboxylic and/or similar amine ends have similar reactivities. Further examples of random polymers are given in U.S. Pat. No. 3,397,107, where the monomer units of nylon 303-T and caprolactam are polymerized in a random fashion. Another example is contained in U.S. Pat. No. 3,594,266, in which a polyethylene oxide diamine, terephthalic acid and caprolactam were polymerized in a random fashion. Since the condensation polymerization is a random sequence of events, it would be extremely improbable to obtain an alternating copolymer using dissimilar monomer units in the condensation reaction as it is known today. An alternating copolymer can be classified as a special type of random copolymer.

Formation of a condensation block copolymer cannot be easily achieved using the conditions described heretofore because of the random reaction of monomeric units. Block copolymer preparations have been described in the patent literature using at least two techniques. One technique, as described before, is melt blending two homopolymers at temperatures where the polyamide becomes reactive to amide interchange, chain extension and hydrolysis. Such a technique is disclosed in U.S. Pat. No. 3,393,252. When the conditions are closely controlled, block copolymers with a distribution of optimum sequence lengths can be prepared.

Another method of preparing block copolymers is described in U.S. Pat. No. 3,683,047. It consists of polymerizing two homoprepolymers of low molecular weight such as from 1000 to 4000. In this specific case, one prepolymer was carboxyl terminated while the other was amine terminated. The results of the polymerization is a block copolymer. Under the conditions of polymerization very little randomization occurred as indicated by little loss of melting point during the blend time. These block copolymers have been called ordered copolymers since by the nature of the starting materials reactive functional groups they cannot react with themselves.

Examples of random copolymers are as follows: CHEMICAL ABSTRACT 88764f, Vol. 70, 1969 (Japanese Pat. No. 28,837/68) dicloses a random copolymer having moisture retention properties prepared from (a) the salt of $H_2N(CH_2)_3O(CH_2)_3NH_2$ (also referred to as 303 diamine) and adipic acid and (b) the monomer caprolactam. JOURNAL OF POLYMER SCIENCE, Vol. XXL, pages 237–250 (1956), "Some Isomorphous Copolyamides", by Cramer et al. describes methods for preparing 303-6 polymer and its resulting properties.

U.S. Pat. No. 3,514,498 also discloses a block (random) copolymer prepared from two polymers, i.e., (a) a polymer resulting from the salt of diamine of polyethylene oxide and adipic acid and $\epsilon$-caprolactam and (b) poly-$\epsilon$-capramide (nylon-6). U.S. Pat. No. 3,549,724 also discloses a block (random) copolymer prepared from (a) polymer prepared from polyethylene oxide diammonium adipate and $\epsilon$-caprolactam and (b) nylon-6 or nylon-6,6. U.S. Pat. No. 3,160,677 discloses a block copolymer prepared from (a) polymer prepared from dibutyloxalate $[(COOC_4H_9)_2]$ and a diamine and (b) polycaprolactam.

Because of the complexity in naming the copolymers of polyamide and poly(dioxa-amide), a shorthand nomenclature is used herein. It is based in part on the nomenclature used to identify aliphatic polyamides. Numbers signify the number of carbon atoms in a polymer. The letter "O" signifies oxygen and its relative location within the polymer; "N" signifies polyamide linkage; "T" signifies terephthalic. Thus "30203" refers to a diamine function while "6" refers to the diacid function. Therefore, "6" refers to six carbon paraffinic diacid and in particular adipic acid. Also "30203" indicates the number of paraffinic carbons and the "O" indicates the placement of oxygen. In this nomenclature a slash (/) designates a random copolymer whereas a double slash (//) indicates a block copolymer. Thus N-30203-6//6 indicates that blocks of N-30203-6 are connected within the copolymer with blocks of "6" (nylon-6).

Contrary to expectations based on the previously discussed art it has now been found that it is possible to prepare a composition comprising a block copolymer of polyamide and poly(oxa-amide) having a moisture uptake better than that of its polyamide precursor, e.g., nylon-6. In addition, fibers of the copolymer have overall fiber properties substantially equivalent to that of such nylons as nylon-6.

SUMMARY OF THE INVENTION

Present invention resides in a novel composition. It has utility as a fiber as well as other utilities. The composition is a block copolymer of a specified polyamide and a specified poly(oxa-amide). The polyamide portion of the molecule is a bivalent radical of a melt spinnable polyamide having no ether linkages. The poly(oxa-amide) portion of this molecule contains both one oxygen linkage, e.g., —R—O—R— and amide linkage, i.e.,

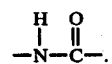

The following repeating structural formula depicts the composition of this invention:

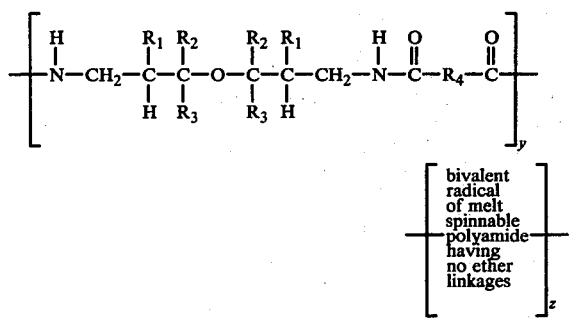

wherein $R_1$, $R_2$ and $R_3$ are selected from the group consisting of H, $C_1$-$C_{10}$ alkyls and $C_3$-$C_{10}$ isoalkyls; $R_4$ is selected from the group consisting of $C_0$-$C_{10}$ alkylenes and $C_3$-$C_{10}$ isoalkylenes; and $y = 4$ to $200$ and $z = 4$ to $200$. The molecular weight of the foregoing block copolymer is about 5000 to 100,000.

DESCRIPTION

As stated heretofore one portion of the novel composition is a melt spinnable polymer having no ether linkages. Melt spinnable refers to a process wherein the polymer, a polyamide, is heated to above its melting temperature and while molten forced through a spinneret. The latter is a plate containing from one to many thousands of orifices, through which the molten polymer is forced under pressure. The molten polymer is a continuous filament and depending on the number of orifices many filaments can be formed at the same time. The molten filaments are cooled, solidified, converged and finally collected on a bobbin. This technique is described in greater detail in ENCYCLOPEDIA OF POLYMER SCIENCE AND TECHNOLOGY, Vol. 8, Man-Made Fibers, Manufacture.

If a single fiber is extruded as in the case when it is intended to be knitted into hosiery, the product is called a monofilament. When the product is expected to be converted into a fabic by knitting or weaving, the number of monofilaments is in the range 10-100. Such a product is known as a multifilament yarn. Yarns for industrial applications such as in the construction of tire cords, usually contains several hundred to a thousand or more filaments. When the fibers are used to make a spun yarn, i.e., a yarn formed by twisting short lengths of fibers together, as in the practice with cotton, the number of orifices used can be tens of thousands. The extruded material is cut into pieces in the range of 1-5 inches long to produce staple fiber. This staple fiber is converted into spun yarn in the same manner as cotton. Polymer of present invention can be prepared into the aforementioned forms by the various methods described.

Also, the polymers of present invention can be used to prepare nonwovens. Nonwoven refers to a material such as fabric made without weaving and in particular having textile fibers bonded or laminated together by adhesive resin, rubber or plastic or felted together under pressure. Many such methods are described in detail in MANUAL OF NONWOVENS, Depl-Ing and Dr. Radko Kroma, Textile Trade Press, Manchester, England.

Polyamides which are crystallizable and have at least a 30° C. difference between melting point and the temperature at which the molten polymer undergoes decomposition can be melt spun. Examples of melt spinnable polyamides having no ether linkages are as follows: nylon-6,6 [also known as poly(hexamethylene adipamide)[; nylon-6,10 [poly(hexamethylene sebacamide)]; nylon-6 [poly(pentamethylene carbonamide)]; nylon-11 [poly(decamethylene carbonamide)]; MXD-6 [poly(-metaxylylene adipamide)]; PACM-9 [bis(paraaminocyclohexyl)methane azelamide]; PACM-10 [bis(-paraaminocyclohexyl)methane sebacamide] and PACM-12 [bis(paraaminocyclohexyl)methane dodecanoamide]; other are listed in ENCYCLOPEDIA OF POLYMERS SCIENCE AND TECHNOLOGY, Vol. 10, Second Polyamide Fibers, Table 12. Methods for preparing these polyamides are well known and described in numerous patents and trade journals.

The aforementioned block of melt spinnable polyamide can contain as few as four repeating units within the polymer of present invention. Data reported in the Examples show that a melt spinnable polyamide, as an illustration, having four repeating units has an estimated melting point which does not differ substantially from the melting point of its relatively high molecular weight polymer. Thus each four repeating unit block, when present in a block copolymer, can retain its own particular properties without substantially degrading the properties of the other repeating unit block. To minimize loss of properties the preferred minimum value of z is 8 and the more preferred value is 10. Z can have a maximum value of 200, a preferred value is 185 and a more preferred value is 160.

The poly(oxa-amide) portion of the composition can be prepared by the following generalized scheme:

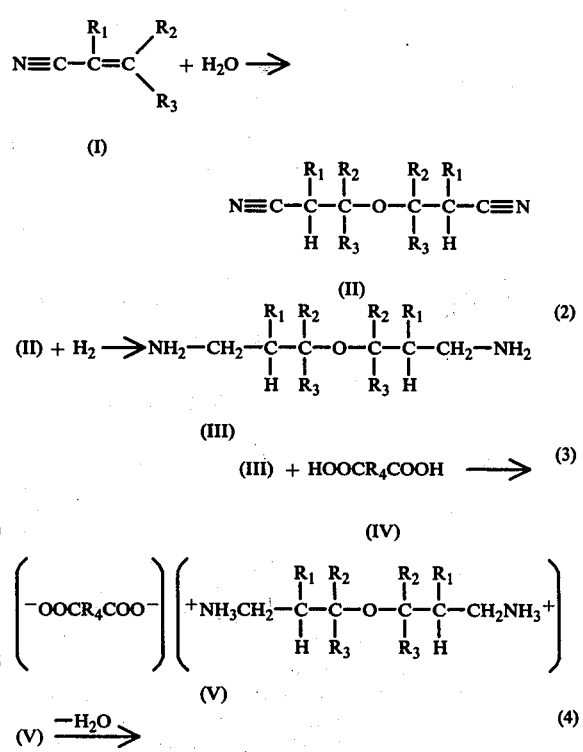

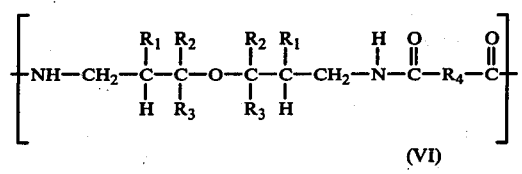

(VI)

Reaction (1) is often referred to a cyanoethylation; particularly wherein $R_1$, $R_2$ and $R_3$ = H; also these R's can be $C_1$-$C_{10}$ alkyls or $C_3$-$C_{10}$ isoalkyls. Diamines of the type (II) are commercially available. Reaction (2) is a hydrogenation. Reaction (3) is the reaction between a diacid and a diamine resulting in a salt. $R_4$ can be one of the following: $C_0$-$C_{10}$ alkylenes and $C_3$-$C_{10}$ isoalkylenes. Reaction (4) is often referred to as a condensation polymerization. Here the repeating unit contains fewer atoms than the monomer and necessarily the molecular weight of the polymer so formed is less than the sum of the molecular weights of all the original monomer units which were combined in the reaction to form the polymer chain. Examples of $C_1$-$C_{10}$ alkyls are methyl, propyl, butyl, pentyl, etc.; examples of the $C_3$-$C_{10}$ isoalkyls are isopropyl, isobutyl, isopentyl and the like.

Examples of $C_1$-$C_{10}$ alkylenes are as follows: methylene, dimethylene, trimethylene and the like; examples of $C_3$-$C_{10}$ isoalkylenes are as follows: methyltrimethylene, methyl-2-tetramethylene and the like. Examples of $HOOCR_4COOH$ of reaction (3) are as follows: oxalic, malonic, succinic, glutaric, adipic, pimelic, suberic, azelaic, subacic, undecanedioic, $\alpha,\beta$-diethylsuccinic and $\alpha$-methyl-$\alpha$-ethyl suberic.

Examples of poly(oxa-amide) polymers that can be prepared via the aforementioned generalized scheme are the following:

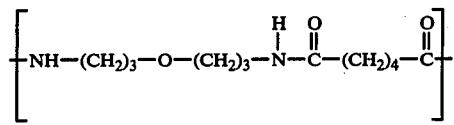

poly(4-oxaheptamethylene adipamide) also N-303-6

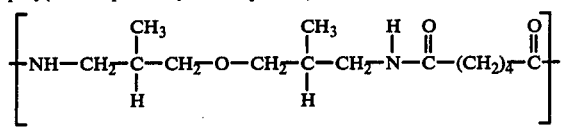

poly(4-oxa-2,6-dimethylmonomethylene adipamide)

The foregoing poly(oxa-amide) block can contain as few as four repeating units, when present in a block copolymer, and retain its own particular properties without substantially degrading the properties of the other repeating unit block. Thus the minimum value for y is 4. To minimize loss of properties the preferred minimum value for the repeating unit is 8, the more preferred value is 10. The maximum value for the repeating unit is 200 while the preferred value is 175 and the more preferred value is 150. Values of y and z are median values.

The polymers of present invention can also contain an antioxidant such as 1,3,5-trimethyl-2,4,6-tris(3,5-ditertiarybutyl-4-hydroxybenzyl)benzene. Small amounts of antioxidant, e.g., 0.5 weight percent, are satisfactory, however, as little as 0.01 weight percent can be used and as much as 2.0 weight percent also can be satisfactory. Antioxidants other than the aforementioned one can be used. The antioxidant generally would be mixed in combination with the two polymers prior to melt blending. Other usual additives for polyamides such as delusterants and/or light stabilizers can also be incorporated.

EXAMPLES

The following describes how the various novel polymers were prepared and the influence of certain variables upon their properties. Also reported are results on comparative polymers.

1. Preparation of Poly(4-oxaheptamethyleneadipamide) (N-303-6)

Forty-four grams of adipic acid were dissolved in 200 milliliters of ethanol. Forty grams of purchased 4-oxaheptamethylene diamine (303) were dissolved in 200 milliliters of isopropanol and the resulting mixture was added to the mixture of said acid and ethanol. An exothermic reaction occurred. Upon cooling, a polymer salt crystallized out of the mixture of alcohols. The polymer salt was collected on a Buchner funnel and subsequently recrystallized from a solution of equal amounts of ethanol and isopropanol. About 30 grams of salt were obtained. A one percent solution of the salt had a pH = 7.3. The salt itself had a melting point of 142.8° C. The salt can be referred to as the salt of 303-6.

About 40 grams of the polymer salt were charged to a heavy walled glass polymer "D" tube. Then the neck of the tube was constricted for sealing and purged of air by evacuating and filling with nitrogen five times. Finally the tube was heated in an aluminum block for two hours at 200° C. After cooling the tip of the tube was broken off and the remaining portion was bent over at a 45° angle by heating and then connected to a manifold and purged of air with nitrogen-vacuum cycles. The tubes were heated at 222° C. under nitrogen at atmospheric pressure for six hours using methyl salicylate vapor baths. On cooling, the tubes were broken and the polymer plug crushed to ⅛″ size pieces. The resulting polymers had inherent viscosities ranging from 0.82 to 0.93 in a meta-cresol solution. One of the polymers had a melting point of 210° C.

2. Polymer Melt Blending

Suitable amounts of dried N-303-6 polymer and nylon-6 were charged to a large test tube having two openings in the rubber stopper. The openings were for a helical stirrer and a nitrogen inlet. The container was purged of air, afterwards the nitrogen filled container was heated using a suitable liquid-vapor bath. The mixture of the two polymers was agitated with the helical stirrer powered by an air motor for the required time. Before allowing the molten polymer to cool, the stirrer was lifted to drain the polymer. After solidification the material was broken up and dried for spinning.

3. Polymer Spinning and Drawing

After the aforementioned melting blending the polymer was charged to micro spinning apparatus consisting of stainless steel tube (⅜″ OD × 12″) with a 0.037″ capillary. The tube was heated with a vapor bath to the temperature consistent with the polymer. Generally, 245° C. was used. Nitrogen was swept through the polymer until the polymer melted and sealed the capillary. After the polymer was completely melted and a uniform temperature had been reached (about 30 minutes), the nitrogen pressure was increased by about 30–50 psig (depending on polymer melt viscosity) to extrude the polymer.

The fiber as it left the tube was drawn on a series of rollers and wound up on a bobbin. The first roller or feed roll was traveling at 35 ft/min. The filament was wrapped five times around this. After crossing a hot pipe maintained at about 50° C. the filament was wrapped around the second roller or a draw roll (five times) which speed varied depending on the draw ratio required (130–175 ft/min). Unlike commercial draw rolls, the fiber tended to abrade itself; that is the fiber coming off rubbed against fiber coming on. This made higher draw ratios difficult to obtain. The third roll had a removable bobbin and was driven at a slightly lower speed than the draw roller.

Draw ratio refers to the ratio of the speed of the second roller or draw roll to the speed of the first roller or feed roll. Thus if the second roller was traveling at 175 ft/min and the first roller at 35 ft/min, the draw ratio is 5 (175/35). This difference in speeds of the rollers stretches the fiber. Stretching or drawing orientates the molecules, i.e., places them in a single plane running in the same direction as the fiber.

4. Results of Tests and Comparative Runs

Accompanying Table I shows the effect of melt blending's temperature and time on various block copolymers having different proportions of poly(oxaamide) and polyamide. Also shown are comparative runs with random copolymers (Runs 12–15), nylon-6 (Run 1) and cotton (Run 2).

Comparison of Runs 5, 6 and 7 indicates that at 20% of N-303-6 in the copolymer an increase in blending time decreases the resulting polymer's melting point. This indicates a decrease in the amount of "blocks" and further indicates an increase in the amount of "randomness".

Comparison of Runs 7, 8 and 9 indicates that at a constant percentage of N-303-6 in the copolymer and at a constant blending time, as the temperature of blending increases substantial decreases occur in inherent viscosity and polymer melting point. This decrease in inherent viscosity reflects decomposition of the macromolecule when the blending time is excessive.

Comparison of Run 12 with Runs 5, 6 and 7 demonstrates the difference between block and random copolymers. Thus the random copolymer of Run 12 has a fiber melting point of 190° C. which is substantially lower than the 218° C. of the block copolymer of Run 5. Thus as the length of the "block" copolymer decreases or the degree of "randomness" increases, i.e., Runs 6 and 7, the fiber melting point decreases.

Tenacity, elongation (to rupture) and initial modulus (textile modulus) and the methods for obtaining such values are defined and described in Kirk-Othmer, ENCYCLOPEDIA OF CHEMICAL TECHNOLOGY, 2nd Edition, Vol. 10, Textile Testing. Higher values of both initial modules and tenacity are preferred. As to % elongation lower values are preferred.

Accompanying Table II shows the moisture regain of N-303-6//6, nylon-6 and cotton. Comparison of Runs 3 and 1 indicates that the incorporation of 20% of N-303-6 into nylon-6 substantially and unexpectly improves the moisture regain of the nylon-6.

Surprisingly the other properties of N-3-03-6//6 have not deteriorated as shown by comparison of Runs 5 and 12, Table I.

Moisture regain refers to the amount of moisture a dried sample of fiber picks up in a constant relative humidity atmosphere. Measurement of this property was carried out using a series of humidity chambers made from dessicators containing suitable saturated salt solutions (i.e., $NaNO_2$ = 65%, NaCl = 75%, KCl = 85% and $Na_2SO_3$ = 95%) at room temperature.

To determine moisture regain first the sample of the fiber was dried in a vacuum dessicator over $P_2O_5$. After a constant weight was obtained the sample was placed in one of the appropriate chambers. The chamber was then evacuated to speed up equilibrium. The fiber remained in the chamber until a constant weight was obtained. The increase in weight of the sample over the dried sample was the amount of moisture regained.

Accompanying Table III shows the effect of boil off on moisture regain of nylon-6, block N-303-6//6 and random N-303-6/6. The data also indicates that boil off has different influences on the amount of increase in moisture regain depending whether the polymer is block or random.

Boil off refers to the placement of the fiber in boiling water for a specified length of time. Afterwards the weight loss is determined. Also after following the procedure described for determining moisture regain the incremental increase in percent moisture regain at 65% relative humidity was determined. Boil off can be considered as akin to a dye treatment.

The increase in moisture regain as a result of boil off is thought to be best understood by the following explanation. By placing the fiber in boiling water portions of the fiber relax. Thus the orientated amorphous sections tend to open up. Boiling off speeds up the relaxation of this unnatural state. This opening up permits the fiber to take up more moisture than it otherwise would be capable of. Heating the fiber, by other than placing in boiling water, will also relax the fiber.

5. Minimum Value for Repeating Units

To determine how few repeating units could be contained within a block and still retain its polymeric properties the data shown in Table IV was obtained. To obtain the data three samples of caprolactam were polymerized at the various conditions shown in the table. Subsequently average molecular weights and melting points were determined. The foregoing two tests were also made on a sample of a purchased polymer. The obtained average molecular weight divided by the molecular weight of the repeating unit in the polymer gives the average value of number of repeating units (i.e. z) in a block. This value is also reported in Table IV. A plot on semi-log graph paper of Runs 1–4 and an extrapolation of the foregoing indicate that with a value of 4 for z the melting point would be an estimated 188° C. Thus since there is only a decrease of 21° C. in melting point despite the substantial decrease of 207 units in z, one can conclude that four repeating units can be contained in a block without adversely changing the properties of the block.

6. Other Results

Analogous results as to various properties of the block copolymer are obtained when nylon-6,6; nylon-6,10; nylon-11; MXD-6; and PACM-12 are used in place of nylon-6 in the polymer melt blending step (2). Also analogous results are obtained when the adipic acid of step (1) is replaced with one of the following: oxalic, succinic, pimelic, azelaic and $\alpha,\beta$-diethylsuccinic.

TABLE I
EFFECT OF MELT BLENDING ON PROPERTIES OF BLOCK COPOLYMERS OF POLY (OXA-AMIDE) AND POLYAMIDE (N-303-6//6

| Run | Material | Percent of 303-6 in Material | Blending Temp. °C | Min-utes | Inherent Viscosity | Melting Points, °C Polymer | Melting Points, °C Fiber | Ten-[b]* acity | (%) Elonga-tion[b] | Initial[b]* Modulus | Moisture[c]* Regain % |
|---|---|---|---|---|---|---|---|---|---|---|---|
| 1 | Nylon | n.a. | n.a. | n.a. | 1.10 | 219 | 219 | 3.7 | 45 | 11.5 | 4.1 |
| 2 | Cotton | n.a. | n.a. | n.a. | n.a. | n.a. | n.a. | — | — | — | 7.6 |
| BLOCK[a] | | | | | | | | | | | |
| 3 | N-303-6//6 | 10 | 282 | 15 | 1.28 | 219 | — | 3.2 | 54 | 8.8 | 3.9 |
| 4 | " | " | 282 | 180 | 1.19 | 211 | 206 | 3.0 | 56 | 13.0 | 3.5 |
| 5 | " | 20 | 282 | 15 | 1.23 | 220 | 218 | 3.3 | 47 | 14.5 | 3.5 |
| 6 | " | " | 282 | 180 | 1.23 | 216 | 210 | 3.2 | 42 | 8.5 | 3.4 |
| 7 | " | " | 282 | 360 | 1.15 | 203 | 202 | 3.2 | 47 | 6.5 | 5.1 |
| 8 | " | " | 295 | 360 | 0.82 | 194 | — | 2.1 | 48 | 8.8 | 3.5 |
| 9 | " | " | 305 | 360 | 0.66 | 192 | — | 0.87 | 39 | 5.5 | 3.7 |
| 10 | " | 30 | 282 | 15 | 1.2 | 220 | — | 3.4 | 59 | 7.0 | 3.2 |
| 11 | " | " | 282 | 180 | 1.1 | 205 | — | 2.6 | 60 | 6.5 | 3.8 |
| RANDOM[a] | | | | | | | | | | | |
| 12 | N-303-6/6 | 20 | n.a. | n.a. | 0.9 | — | 190 | 2.6 | 84 | 9.3 | 4.0 |
| 13 | " | 25 | " | " | 0.9 | — | 181 | 2.3 | 86 | 6.3 | 3.7 |
| 14 | " | 30 | " | " | 1.0 | — | 173 | 2.4 | 80 | 6.9 | 4.8 |
| 15 | " | 50 | " | " | — | — | — | DID NOT SPIN | | — | — |

RH = relative humidity
n.a. = not applicable
[a]No boil off
[b]Draw ratio 3.7 ambient RH, but no significant difference observed as various RH; 40 monofilaments twisted together.
[c]At Relative Humidity of 65%
* = Units are grams/denier.

TABLE II
MOISTURE REGAIN OF BLOCK COPOLYMER OF POLYAMIDE AND POLY (OXA-AMIDE) (N-303-6//6, MONOFILAMENT, AFTER BOIL OFF)

| Run | Material | Percent of 303-6 in Material | Moisture Regain (%) 95% RH[a] | 85% RH[a] | 75% RH[a] | 65% RH[a] |
|---|---|---|---|---|---|---|
| 1 | Nylon-6 | n.a. | 7.6 | 5.8 | 4.5 | 4.1 |
| 2 | Cotton | n.a. | 14.5 | 11.8 | 9.5 | 7.6 |
| 3 | N-303-6//6[b] | 20 | 10.4 | 8.6 | 6.7 | 4.4 | n.a. = not applicable
[a]% RH = percent relative humidity
[b]Melt blended at 283° C for 30 minutes, draw ratio 3.7.

TABLE III
EFFECT OF BOIL ON MOISTURE REGAIN

| Run | Material | Percent of 303-6 in Material | Blending Conditions Temp. °C | Time-Minutes | Increase in % Moisture Regain Due to Boil Off |
|---|---|---|---|---|---|
| 1 | Nylon-6 | — | — | — | 0.5 |
| 2 | N-303-6//6 | 20 | 282 | 360 | 1.0 |
| 3 | N-303-6/6* | 20 | n.a. | n.a. | 1.3 | n.a. = not applicable
* = Prepared by condensation caprolactam and 303-6 salt.

TABLE IV

| | Minimum Value For Repeating Units | | |
|---|---|---|---|
| | Resultant Polymer (Caprolactam) | | |
| Run | Conditions | Average Molecular Weight[a] | Value of z[b] | Melting Point °C[c] |
|---|---|---|---|---|
| 1 | Purchased | 23,809 | 211 | 209 |
| 2 | 3 hrs at 250° C and 1 ml H$_2$O | 7,874 | 70 | 205 |
| 3 | 3 hrs at 250° C and 4 ml H$_2$O | 6,211 | 55 | 201 |
| 4 | 2 hrs at 250° C | 2,024 | 18 | 188 |
| 5 | monomer (caprolactam) | 113 | 1 | 70 |

[a]Molecular weight is based on amino ends.
[b]Average molecular weight divided by 113 which is molecular weight of nylon's monomer, i.e. caprolactam.
[c]Melting point determined by Differential Scanning Colorimeter;;onset value.

The invention claimed is:

1. A block copolymer having a molecular weight of about 5000-100,000 and the following repeating structural formula:

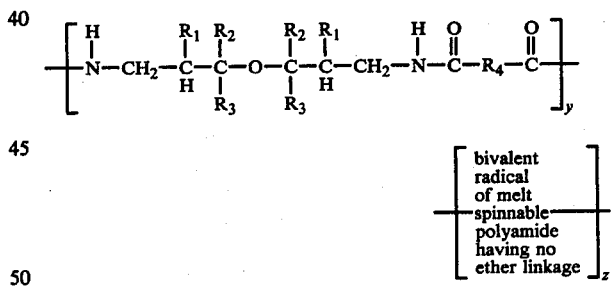

[bivalent radical of melt-spinnable polyamide having no ether linkage]$_z$ wherein
$R_1$, $R_2$ and $R_3$ are selected from the group consisting of H, $C_1$-$C_{10}$ alkyls and $C_3$-$C_{10}$ isoalkyls;
$R_4$ is selected from the group consisting of $C_0$-$C_{10}$ alkylenes and $C_3$-$C_{10}$ isoalkylene; and
y = 4–200
z = 4–200.

2. A copolymer according to claim 1 wherein the copolymer is hydrophilic.

3. A copolymer according to claim 2 wherein the copolymer has a percent moisture regain of at least 4% at a relative humidity of 65%.

4. A copolymer according to claim 1 wherein the bivalent radical polyamide is selected from the group consisting of nylon-6, nylon-6,6 and PACM-12.

5. A copolymer according to claim 4 wherein the copolymer is hydrophilic.

6. A copolymer according to claim 5 wherein the copolymer has a percent moisture regain of at least 4% at a relative humidity of 65%.

7. A copolymer according to claim 6 where $R_1$, $R_2$ and $R_3$ are H and $R_4$ is a $C_1$-$C_{10}$ alkylene.

8. A copolymer according to claim 7 wherein $R_4$ is a $C_2$ alkylene.

9. A fiber obtained by spinning the copolymer of claim 1.

10. A fiber obtained by spinning the copolymer of claim 7.

11. A fiber obtained by spinning the copolymer of claim 8.

12. A fiber according to claim 1 wherein the fiber is obtained by melt spinning.

13. A fiber according to claim 7 wherein the fiber is obtained by melt spinning.

14. A fiber according to claim 8 wherein the fiber is obtained by melt spinning.

15. A monofilament obtained by extrusion of the copolymer of claim 1.

16. A monofilament obtained by extrusion of the copolymer of claim 7.

17. A monofilament obtained by extrusion of the copolymer of claim 8.

18. A yarn obtained by twisting fibers of the copolymer of claim 1.

19. A yarn obtained by twisting fibers of the copolymer of claim 7.

20. A yarn obtained by twisting fibers of the copolymer of claim 8.

21. A fabric obtained by weaving yarn of the copolymer of claim 1.

22. A fabric obtained by weaving yarn of the copolymer of claim 7.

23. A fabric obtained by weaving yarn of the copolymer of claim 8.

24. A fabric obtained by knitting yarn of the copolymer of claim 1.

25. A fabric obtained by knitting yarn of the copolymer of claim 7.

26. A fabric obtained by knitting yarn of the copolymer of claim 8.

27. A fabric obtained by knitting monofilament of the copolymer of claim 1.

28. A fabric obtained by knitting monofilament of the copolymer of claim 7.

29. A fabric obtained by knitting monofilament of the copolymer of claim 8.

30. A nonwoven fabric obtained by laminating the copolymer of claim 1.

31. A nonwoven fabric obtained by laminating the copolymer of claim 7.

32. A nonwoven fabric obtained by laminating the copolymer of claim 8.

33. A fiber comprising the copolymer of claim 1.

34. A fiber comprising the copolymer of claim 7.

35. A fiber comprising the copolymer of claim 8.

36. A monofilament comprising the copolymer of claim 1.

37. A monofilament comprising the copolymer of claim 7.

38. A monofilament comprising the copolymer of claim 8.

39. A yarn comprising the copolymer of claim 1.

40. A yarn comprising the copolymer of claim 7.

41. A yarn comprising the copolymer of claim 8.

42. A fabric comprising the copolymer of claim 1.

43. A fabric comprising the copolymer of claim 7.

44. A fabric comprising the copolymer of claim 8.

45. A nonwoven fabric comprising the copolymer of claim 1.

46. A nonwoven fabric comprising the copolymer of claim 7.

47. A nonwoven fabric comprising the copolymer of claim 8.

* * * * *